Sept. 4, 1951 R. BIRMANN 2,566,550
CONTROL FOR CENTRIFUGAL COMPRESSOR SYSTEMS
Filed Sept. 21, 1943 8 Sheets-Sheet 1

INVENTOR
Rudolph Birmann
BY
ATTORNEYS.

WITNESS:

FIG.3.

Sept. 4, 1951  R. BIRMANN  2,566,550
CONTROL FOR CENTRIFUGAL COMPRESSOR SYSTEMS
Filed Sept. 21, 1943  8 Sheets-Sheet 3

INVENTOR
Rudolph Birmann
BY
ATTORNEYS

Sept. 4, 1951 R. BIRMANN 2,566,550
CONTROL FOR CENTRIFUGAL COMPRESSOR SYSTEMS
Filed Sept. 21, 1943 8 Sheets-Sheet 4

INVENTOR
Rudolph Birmann
BY
Busser & Harding
ATTORNEYS.

WITNESS:
Rob. R. Mitchel

Sept. 4, 1951 R. BIRMANN 2,566,550
CONTROL FOR CENTRIFUGAL COMPRESSOR SYSTEMS
Filed Sept. 21, 1943 8 Sheets-Sheet 7

WITNESS:

INVENTOR
Rudolph Birmann
BY
ATTORNEYS.

Patented Sept. 4, 1951

2,566,550

UNITED STATES PATENT OFFICE 2,566,550

CONTROL FOR CENTRIFUGAL COMPRESSOR SYSTEMS

Rudolph Birmann, Newtown, Pa., assignor, by mesne assignments, to Turbo Engineering Corporation, a corporation of Delaware Application September 21, 1943, Serial No. 503,238

12 Claims. (Cl. 60—13)

This invention relates to the control of centrifugal compressor systems and, in its more specific aspects, the control of a turbo supercharger system involving a centrifugal compressor, the system being driven by engine exhaust gases.

Superchargers of the type just indicated are well adapted for use in connection with aircraft engines, particularly since very large amounts of energy are available in the engine exhaust gases and may be used for the driving of turbines. One aspect of the present invention relates to controlling means whereby the supercharger unit may be properly operated under various conditions and particularly under conditions of quite low air weight flow. In particular, provision is made for avoidance of surge or pulsation.

That phase of the invention which relates to the avoidance of surge conditions is applicable more broadly than to turbo superchargers, and within the scope of the invention is the avoidance of surge in centrifugal compressors generally, irrespective of the type of drive used or the utilization of the air handled.

The invention further relates to controls whereby a compressor is caused to deliver air at substantially constant absolute pressure for a wide range of conditions, whereby a minimum gauge pressure is maintained, whereby the speed of drive thereof is limited to safe values, and whereby control is effected in the case of a supercharger installation to prevent abnormal rise in temperature of the turbine-driving gases in the event that unburned fuel enters the exhaust so as to be burned in the gas chest or other gas passages of the turbine by air which is bypassed to the turbine from the compressor in accordance with the present system.

A somewhat similar control system is disclosed in my application Serial Number 443,956, filed May 21, 1942 (now abandoned), and the present application contains claims covering the generic features of that application and the present one.

The foregoing and other objects of the invention, particularly relating to details of operation and construction, will become apparent from the following description read in conjunction with the accompanying drawings, in which.

Figure 1:
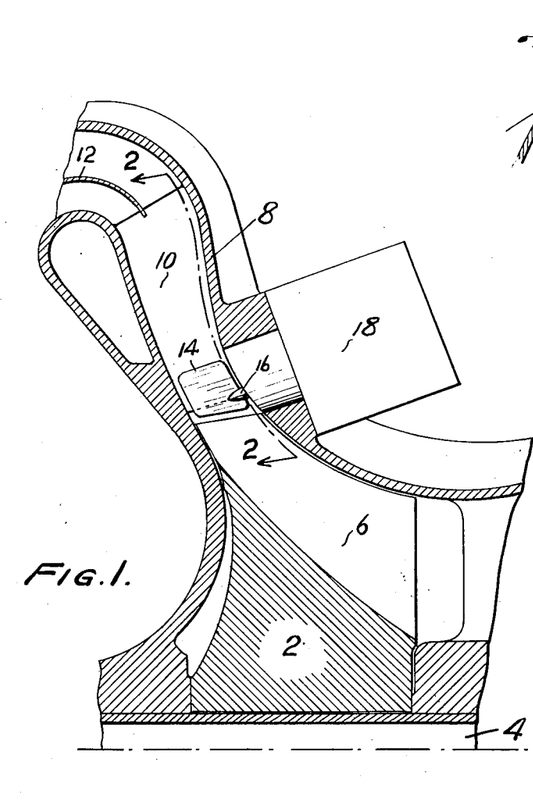
Figure 1 is a fragmentary axial section through a compressor associated with an anti-surge control in accordance with the present invention.
Figure 2:
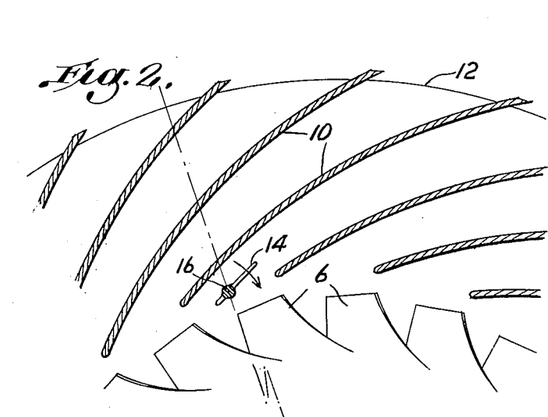
Figure 2 is a fragmentary section taken on the surface of revolution, the trace of which is indicated at 2—2 in Figure 1.

There will first be described, with particular reference to Figures 1, 2, and 3, the system involved, there being described hereafter the forms taken by particular elements which are merely diagrammed in Figure 3 and which will be initially described with reference only to their functions.

An impeller 2 is mounted upon a shaft 4 and is provided with air passages 6 arranged to discharge the air into the passages between the diffuser vanes 10, the air being then guided, for example, to a further stage of the compressor by annular guiding means indicated at 12. The invention is applicable quite generally to compressors, which may comprise one or more stages, and, for simplicity of description, there is illustrated in Figure 3 the application of the invention to a single-stage compressor. As will be made clear hereafter, the invention is not limited to use in connection with supercharging of aircraft engines; but since this represents an elaborate application of the invention, and one which is of particular utility, the description is made with reference thereto.

Between the entrance edges of one pair of diffuser vanes 10 there is located, desirably in about the position illustrated in Figures 1 and 2, an element 14 carried by a shaft 16, which element will be hereinafter referred to as a flag. It has been found that if such a flag is mounted for substantially free rotation about the axis of its shaft 16 as illustrated, it becomes a very sensitive indicator of the onset of surge conditions, moving, as air delivery rate decreases, in the clockwise direction indicated by the arrow in Figure 2, the flag taking the direction of the velocity vector of the air flow as it leaves the impeller and before the diffuser vanes have an appreciable effect on the direction of flow. Thus an approach to the beginning of surge conditions is indicated by a clockwise rotation of the flag beyond some definite angular position readily ascertained by test for any particular compressor. It is found that the position of the flag at the approach of surge conditions is quite independent of the speed of operation of the impeller and also of pressure and temperature conditions of the air, so that the flag offers the great advantage of being a detector for which no corrections are required to take into account these factors. The shaft 16 is connected to a control indicated diagrammatically at 18, both the functions and construction of which will be hereafter described in detail.

Figure 3:
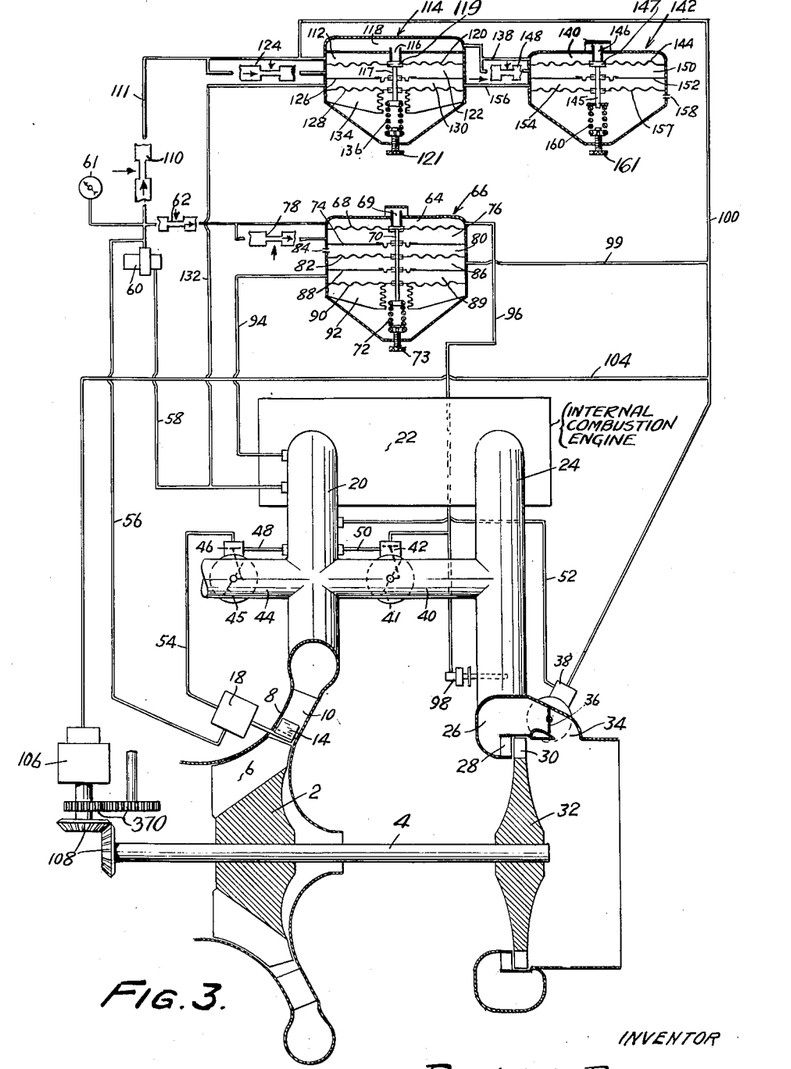
Figure 3 is a diagram showing the elements of a preferred form of the improved control system.

The compressor is indicated in Figure 3 as delivering its air to the intake passage 20 of an internal combustion engine 22 for the purpose of supercharging the latter, fuel being, of course, introduced into the compressed air in conventional fashion. The exhaust passage of the engine is indicated at 24 and is shown as delivering the exhaust gases to the gas chest 26 of an exhaust gas turbine 32 arranged to drive the compressor shaft 4. The gases are delivered from the gas chest 26 through nozzles 28 to the buckets 30 of the conventionally illustrated turbine wheel 32. In order to control the operation of the turbine, a passage 34 is provided to spill the exhaust gases from the chest 26 to an extent determined by the position of a waste gate 36 controlled by a pneumatic motor 38.

A bypass connection 40 between the air intake passage 20 and the exhaust gas passage 24 is controlled by means of a bypass valve 41 operated by a pneumatic motor 42. Another passage connecting the air passage 20 with the atmosphere is indicated at 44, being controlled by a spill valve 45 actuated by a pneumatic motor 46. The motors 38, 42, and 46, which will be hereafter described in detail, are energized by the compressed air in the passage 20 through connections indicated at 48, 50, and 52. These various motors are controlled in accordance with the operating conditions by various means which will now be described.

The control of the motor 46 to open the spill valve 45 is effected through connection 54 by means of the relay device 18 controlled by the flag 14 in such fashion that as the surge point is approached, the valve 45 is opened, thus increasing the flow of air through the impeller to such an extent as to avoid surge conditions. The air for the operation of the relay 18 is taken through connection 56 from the output of a pressure regulator indicated at 60, receiving its air supply through the connection 58 from the air delivery passage 20. The pressure control 60, which will be hereafter described, is arranged to provide, for the control of the various relays and motors, a pressure which is constantly a predetermined amount above the surrounding atmospheric pressure, for example, two inches of mercury above atmospheric pressure. This pressure is desirably indicated by a gauge 61 in a position where it is observable by a pilot so that he may ascertain whether the automatic controls are in operating condition.

Air under such controlled pressure from the pressure regulator is fed through a flow restriction indicated at 62 into the uppermost chamber 64 of a relay 66 which will be designated as the bypass relay, its function being the control of the bypass valve 41. The chamber 64 is defined by the upper end of the casing of the relay and a movable diaphragm 68 to which is connected a rod 70, the upper end of which carries a valve which in its upper position closes an outlet 69 from the chamber 64 to the atmosphere. The rod 70 is urged upwardly by a spring 72, the compression of which is adjustable by means of a screw 73 arranged to be either directly or remotely controlled by the pilot.

Figures 7, 8:
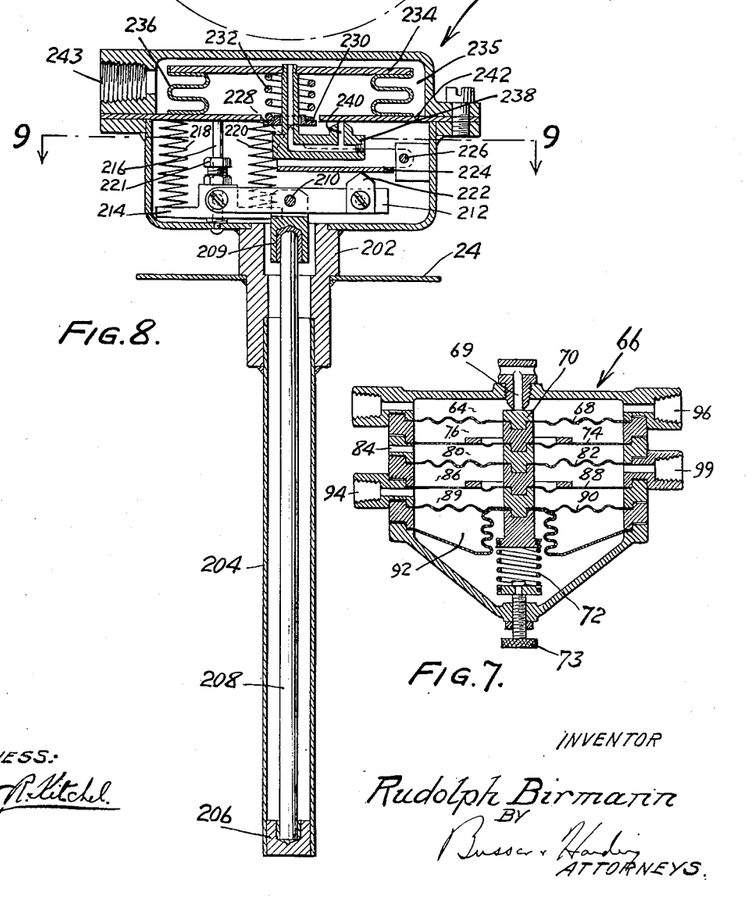
Figure 7 is an axial section through one of the pneumatic relays shown in Figure 3, the construction being essentially typical of all of the pneumatic relays used.
Figure 8 is a longitudinal section through the temperature-controlled element.

Beneath the diaphragm 68 is a chamber 76, the lower side of which is defined by an inflexible wall 74 having a flexible connection of small area, as indicated in Figure 7, with the rod 70. Beneath the wall 74 is another chamber 80 vented to the atmosphere through an opening 84 and having its bottom defined by a flexible diaphragm 82 also connected to the rod 70. Beneath this diaphragm 82 is another chamber 86 having its lower wall defined by an inflexible diaphragm 88 also having a flexible connection with the rod 70. Beneath this diaphragm 88 is a further chamber 89 defined by the flexible diaphragm 90 connected to the rod 70, beneath which there is located an evacuated chamber 92, the rigid bottom of which has a flexible closure connection with the rod 70. The details of this relay are illustrated in Figure 7. The flexible diaphragms 68, 82, and 90 are metallic and serve to transmit the pressures exerted thereon to the rod 70, each having stiffness adding to that of the spring 72. The flexible connections of the rigid diaphragms to the rod 70 are made of rubber-like material and by reason of their small areas exert only minor pressures on the rod. Two further relays, hereafter described, are generally similar in construction and will be sufficiently understandable from Figure 3 and the details illustrated in Figure 7 without being themselves shown or described in detail.

The chamber 89 is connected through 94 to the air delivery passage 20 so that the diaphragm 90 is subjected on its upper surface to the delivery pressure of the compressor. Since beneath this diaphragm there is the evacuated chamber 92, there appears across the diaphragm 90 a pressure difference substantially proportional to the absolute pressure of the air delivered by the compressor, this pressure being exerted upon the rod 70 as a component of force thereon tending to move it downwardly to open the vent 69.

The uppermost chamber 64 is connected through tube 96 to the motor 42 for control of the latter and is also connected to the temperature-responsive element 98. The arrangement of the motor 42 is such that the valve 41 is opened when air pressure is supplied thereto through the flow restriction 62 and the chamber 64. Bleeding of air through the vent 69 from the chamber 64 will lower the pressure appearing at the motor 42 to effect movement of the valve 41 towards closed position. The same result is effected by the bleeding of air from the passage 96 through the medium of the control 98 upon abnormal rise beyond a predetermined value of the temperature of the gases in or approaching the gas chest 26. Such condition may exist, for example, when a rich mixture is fed to the engine so that unburned fuel meets air entering the exhaust passage through the bypass 40 causing combustion. Under such conditions, the valve 41 must be closed.

A connection 99 joins the chamber 86 with the line 100 through which the motor 38 is controlled. Also connected to the line 100 through a branch 104 is the speed control 106, the details of which are hereafter described, which is arranged to be driven through gearing diagrammatically indicated at 108 from the shaft 4. As will be pointed out hereafter, the control 106 is designed to vent the line 100 to the atmosphere when the speed of the shaft 4 exceeds a predetermined maximum.

Air under the controlled pressure from the regulator 60 is delivered through a flow restricting device 110 to a line 111 connected to a chamber 112 of a relay 114 which, for reasons which will be apparent later, may be designated as an absolute pressure relay. The rigid top of the chamber 112 is provided with an aperture 116 communicating with an upper chamber 118 in the relay. The aperture 116 is adapted to be controlled by a valve member 119 carried by a stem 117 connected to the flexible diaphragm 120 forming the bottom of the chamber 112. Below the diaphragm 120 is a chamber 122 having a rigid bottom 126 which has a flexible connection with the rod 117. Beneath 126 is another chamber 130 having its bottom formed by a flexible diaphragm 128 also connected to the rod 117. Beneath this is an evacuated chamber 134 having a flexible closure connection with the rod 117. The rod is urged upwardly by a spring 136, the compression in which is adjustable by means of a screw 121 under control of the pilot.

The line 111 is connected to the chamber 122 through a flow restriction 124, the function of which will be described hereafter. Chamber 130 is connected through line 132 with the air delivery passage 20.

A connection 138 joins the chamber 118 of the absolute pressure relay 114 with the uppermost chamber 140 in another relay 142 which, for reasons hereafter apparent, will be called the gauge pressure relay. The bottom of the chamber 140 is formed by a flexible diaphragm 144 which is connected to a rod 145 carrying a valve member 147 controlling a vent 146 from the chamber 140 to the atmosphere. Beneath the diaphragm 144 is a chamber 150 connected through a flow-restricting means 148 to the connection 138. The bottom of the chamber 150 is closed by a rigid diaphragm 152 having a flexible connection with the rod 145.

Beneath 152 is a chamber 154 connected as indicated at 156 with the chamber 130 of the relay 114. Through the connection 156 it is subjected to the pressure of the passage 20 to which it may, of course, be directly connected. The bottom of the chamber 154 is closed by the flexible diaphragm 157 which is connected to the rod 145. The space beneath the diaphragm 157 is open to the atmosphere as indicated at 158 and contains the spring 160 tending to urge the rod 145 upwardly toward vent-closing position, the compression of the spring 160 being adjustable through the medium of a screw 161 under control of the pilot.

The relays 114 and 142 need not have their structural features described in detail since these will be apparent from the illustrations in Figure 7 of the details of construction of the relay 66, the relays 114 and 142 being quite similar thereto, with the major differences including the chamber 118 of relay 114 into which the vent 116 delivers air, and the absence of the vacuum chamber, such as 82, from the relay 142.

The flow restrictions 78, 124, and 148, which are preferably adjustable and may take the form of passages controlled by needle valves, cause the relays to be of isoposic type, providing a reset to eliminate hunting and to maintain practically constant the controlled pressure except immediately after a disturbance. Flow restrictions 62 and 110 may also be adjustable to secure wide ranges of operation.

Before proceeding to a description of the details of the elements diagrammed in Figure 3, an outline of the operation of the system may be given. Preliminarily, since the various parts of the system are responsive to pressure conditions and the limiting factors of surge, temperature, and speed, reference will be made to the operations involved considering only these proximate causes without reference to the flight conditions from which these causes, in turn result. This preliminary description will make clear the applicability of the controls, alone or in combination, to centrifugal compressor systems in general, and, for example, to a combustion turbine power plant operating independently of an engine.

Considering first the combination of the relays 114 and 142, these are adapted for the control of the motor 38 through the connection 100 to the line 111 which receives air under controlled pressure through the flow restriction 110. By reason of the presence of the restriction, if the line 100—111 is not vented the control pressure for the motor 38 will be that delivered by the regulator 60 since, as will be pointed out later, there is no leakage of air from the control chamber of the motor 38. On the other hand, if venting of the line 100—111 occurs, then due to the flow restriction 110 the control pressure appearing at the motor 38 will be reduced to a degree depending upon the extent of venting. The relays 114 and 142 perform the function of venting this control line as will now be described.

It will be noted that the vents 116 and 146 are in series so that venting will not occur unless both of these are open.

In the case of the relay 114, the rod 117 is subjected to three forces imposed through the flexible diaphragms 120 and 128 and the spring 136. The spring 136 tends to close the vent 116. Opposing this is the opening force exerted by the pressure across the diaphragm 128 due to the delivered air pressure applied through connection 132 against the residual very low pressure in the evacuated chamber 134. It will be seen that the pressure exerted on the diaphragm 128 is thus substantially proportional to the absolute pressure of the air delivered by the compressor, whence the designation of this relay as the absolute pressure relay. Also exerting a minor effect is the flexible diaphragm 120 which is subjected to the difference in pressure between the chambers 112 and 122, which difference exists only by virtue of the restriction of flow provided at 124. It will be noted that due to this flow restriction, opening and closing of the vent 116 are respectively opposed by reason of the setting up of small pressure differences due to the presence of the restriction 124. Isoposic control is thus secured as above indicated.

In the case of the relay 142, the rod 145 is subjected to forces exerted by the diaphragms 144 and 157 and the spring 160. The spring 160 tends to maintain the vent 146 closed. The pressure exerted on the top of diaphragm 157, namely the pressure of the air delivered by the compressor, acts against the atmospheric pressure below this diaphragm to exert an opening force on the rod 145. It will be evident that in this case the net opening force exerted by the diaphragm 157 is substantially proportional to the difference between the air delivery pressure and the atmospheric pressure, from which there follows the reference to the relay 142 on the gauge pressure relay.

The diaphragm 144, operating in conjunction with the flow restriction 148, has a control function substantially similar to that of the diaphragm 120 of relay 114; i. e., by reason of it, an isoposic action is secured.

By reason of the location of the vents 116 and 146 in series as above pointed out, it will be evident that both the absolute pressure of the air delivered by the compressor and the difference between this pressure and atmospheric pressure must both exceed predetermined values before venting of the line 100—111 will occur, the respective values for operation being adjustable by the pilot through the control of the compression of springs 136 and 160. The venting, as will be apparent from the foregoing, will, by reduction of the control pressure at the motor 38, serve to open the waste gate 36 to spill exhaust gases from the engine to a predetermined degree to the atmosphere. The conditions involved will be made clear from Figure 17, in which the delivered pressure of air from the compressor is diagrammed against atmospheric pressure. The line ABC therein represents the pressure to be maintained according to the settings of the relays 114 and 142. So long as the atmospheric pressure is low, the delivery pressure desired is given by the line AB. This is determined by the absolute pressure relay setting. If this absolute pressure were maintained beyond B, however, the pressure would be insufficiently in excess of atmospheric pressure, so that at B the gauge pressure relay will become effective to maintain a predetermined difference between the air delivery pressure and atmospheric pressure represented by the line BC located above the 45° line OD to the extent of this predetermined difference, i. e., the required gauge pressure.

Figure 17:
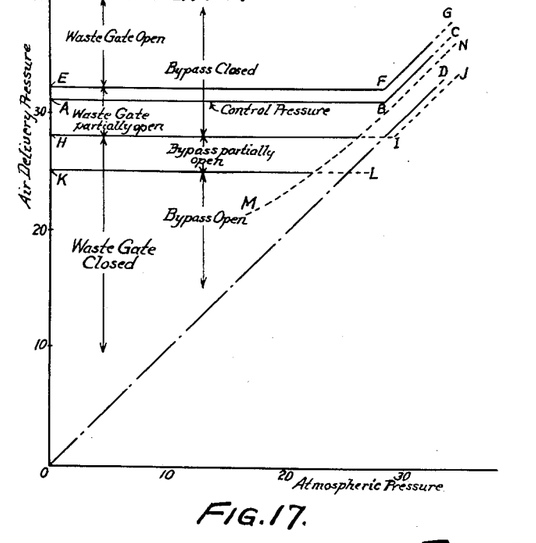
Figure 17 is a diagram showing the relationship of various operating conditions of the system to pressures.

Under ordinary operating conditions the pressures represented by ABC will be maintained by a partially open condition of the waste gate, the degree of opening being indicated by the showing in the diagram of the pressure conditions EFG above which, if they could exist, the waste gate would be fully open and the conditions HIJ below which the waste gate would be fully closed. While the relay system strives to maintain these conditions, it will be evident that the operation of the engine may render them unattainable. For example, as the engine is throttled down, the exhaust energy will decrease so that the waste gate will close to a further extent until ultimately, when fully closed it can maintain conditions only as indicated at HIJ. With still further decrease of available energy in the exhaust gases the air delivery pressure would rapidly drop off if it were not for the fact that at HIJ the bypass valve 41 will begin to open so that air from the compressor will then be added to the turbine driving gases available from the engine to bolster the turbine power helping thereby to maintain the air delivery pressure. As the available engine exhaust gases decrease, the bypass valve progressively opens until under pressure conditions KL it will be fully open. From there on, the controls are no longer effective, the turbo-compressor thereafter providing an air pressure which is dependent upon the exhaust gas energy. The line MN represents, typically, the limit of actual operation, this occurring to the left and above that line. It may be noted that the vertical spacing between the right-hand portion of MN and the line OD represents the minimum gauge pressure which will serve for proper operation of the relays, i. e., is equal to the gauge pressure delivered by the pressure controller 60. The dotted parts of the various pressure lines to the right of MN do not represent attainable conditions, being shown merely to complete the theoretical picture.

The spacings between EFG, ABC, HI and KL and their pressure valves are adjustable by adjustment of the various reset resistances and relay loading springs. What is illustrated, therefore, is just a typical adjusted condition.

Under some conditions, for example, at very high altitudes, the complete closure of the waste gate may not result in attainment of the predetermined pressures within the speed limit of the turbine, though there may be available sufficient exhaust gas energy to drive the turbine at excessive speed to meet the pressure requirements. Under such conditions the speed control 106 will open the waste gate to limit the speed even though the delivery pressure may remain deficient.

The relay 66 has its stem 70 subjected to pressures exerted by the flexible diaphragms 68, 82, and 90, and the spring 72. The spring 72 tends to close the vent 69. The diaphragm 90 is subjected to a pressure difference, tending to open the vent 69 substantially proportional to the absolute pressure of the air delivered by the compressor. The diaphragm 82 is subjected to the difference of pressure between the atmosphere and the pressure existing in the line 100. This difference decreases upon such increase of pressure in the discharge 20 as will vent the line 100. Accordingly, whenever the conditions for waste gate opening appear there is exerted an additional force (algebraically speaking) on the rod 70 to open the vent 69. The motor 42 is connected so as to close the bypass 41 whenever the pressure in the chamber 64 is vented. This means that whenever the waste gate 36 is opened, the bypass 41 will be closed. It follows, therefore, considering Figure 17, that even if due to the adjustment of spring 72, the bypass would open upon the dropping of delivered air pressure below some value exceeding HI the bypass will, nevertheless, not open except under pressure conditions below the line HI. In other words, by reason of the connection 99 the control of the bypass valve by the absolute pressure of the discharged air is modified to insure that the bypass may open only when the waste gate is closed, its conditions for opening being, in effect, depressed by those which are critical for the waste gate. Not only is the bypass not needed to supply driving gas to the turbine as long as the waste gate is open, but prevention of bypass at this time will usually avoid burning of unburned fuel by the air since under conditions of rich mixture the waste gate will usually be open.

The bypass is under the further control of the temperature-responsive device 98 which is so arranged as to bleed air to the atmosphere through connection 96 from the chamber 64 whenever the temperature rises to an abnormal degree. The bleeding of the air to the atmosphere reduces the pressure of the control air in motor 42, and, hence, causes the valve 41 to close. Thus under unusual conditions, burning of fuel in the gas chest may be prevented at least to any degree which would cause the temperature to rise above some maximum.

The speed control 106 bleeds air to the atmosphere through the connection 104 whenever the speed of the shaft 4 rises to an abnormal degree. Under such conditions the control pressure on motor 38 is reduced and, consequently, the waste gate 36 is opened to bypass combustion gases directly to the atmosphere rather than through turbine 32.

The function of the anti-surge controller 18 is to avoid surge by insuring that the compressor is at all times handling sufficient air to prevent surge conditions. As mentioned in connection with Figure 2, the flag 14 moves clockwise as viewed in that figure as surge conditions are approached. By proper adjustment, as hereafter pointed out, such movement will serve to control air pressure in control chamber 46 through the medium of the controller 18 to open the spill valve 45 whenever surge is about to occur, thus increasing the air flow through the compressor. While not mechanically connected, it will be evident that the valves 45 and 41 will be automatically interrelated. For example, the opening of valve 41 will cause the impeller to hande additional air and, consequently, make more remote the conditions likely to give rise to surge as the feed of air to the engine is cut down. These conditions are largely tied up with flight conditions and will be described later.

It may be remarked that stability is insured by reason of the fact that the bypass 41 has a delay in response (though small) substantially greater than that of the surge control.

Figures 4, 5, 6:
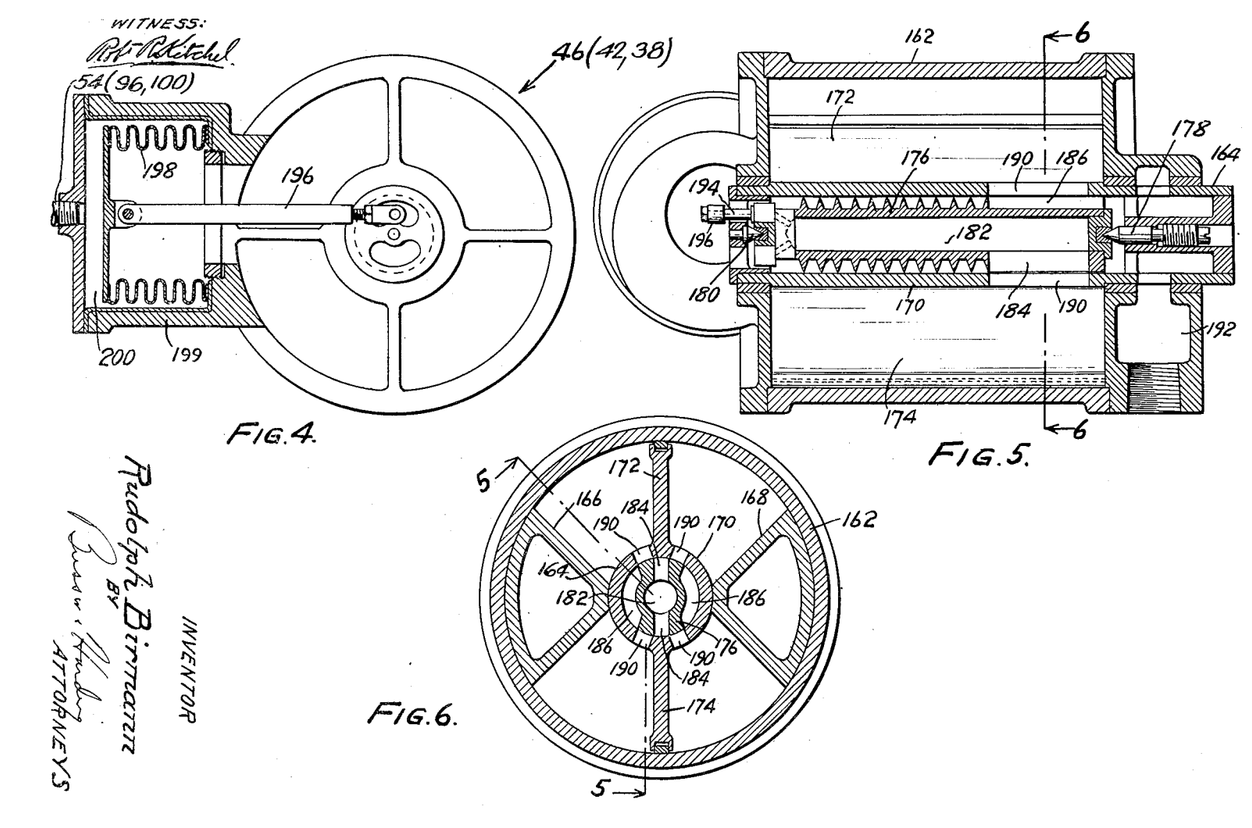
Figure 4 is an end elevation, partly in section, illustrating one of the valve-operating motors involved in the system.
Figure 5 is an axial section of the same taken on the broken surface, the trace of which is indicated at 5—5 in Figure 6.
Figure 6 is a radial section taken on the plane indicated at 6—6 in Figure 5.

Figures 4, 5, and 6 illustrate the construction of the valve-controlling motors 46, 42, and 38 which may be identical. For simplicity of description these figures may be taken to represent the particular motor 46.

A cylindrical casing 162 has concentrically mounted therein a shaft 164 having a hollow cylindrical portion 170 mounted between barriers 166 and 168 which define quandrantal spaces in which are movable vanes 172 and 174 carried by the shaft. A pilot valve 176 is mounted within the cylinder 170 by pivoted bearings 178 and 180 to minimize friction. This pilot valve is provided with a central bore 182 with which communicate radial openings 184. The pilot valve is so formed as to provide axial spaces 186 which open through one end thereof. The bore 182 communicates with the atmosphere. Openings 190 on the opposite sides of each vane extend through the cylindrical portion 170 of the shaft 164 and furnish communication between the air spaces on opposite sides of the vanes 172 and the passages provided by the pilot valve. As will be evident from Figure 6, when the parts are in stable rest position the openings 190 are just closed by valve surfaces of the pilot valve.

Air for furnishing the power to drive the motor enters at 192 which is in communication with the passages 186. This air, introduced at 192, is that entering the motor 46 through the connection 48 to the compressor discharge. In the case of the motors 38 and 42, the air thus entering comes from the connections 52 and 50, respectively.

The pilot valve is provided with a crank pin 194 connected by a link 196 with the head of a bellows 198 within a casing 199 and providing an expansible chamber 200 connected to the control line 54. The resiliency of the bellows may provide the necessary spring action or, if desired, an auxiliary spring may be provided.

The operation of the motor, which is essentially conventional and not a matter of novelty in this application, will be readily understood from consideration of Figure 6. The motion of the pilot valve will be a function of the gauge pressure existing in chamber 200. Assume, for example, that the pilot valve moves from the position illustrated in Figure 6 in counter-clockwise direction. Under such conditions air under compression will enter through passages 186 and openings 190 into the chambers on the clockwise sides of the vanes 172 and 174. At the same time, their opposite sides will communicate through openings 190 and connections 184 with the bore 182 which is open to the atmosphere. As a result, the vanes 172 and 174 will be forced counter-clockwise to follow the pilot valve. A condition of equilibrium results as soon as the relative positions occupied by the pilot valve and the vanes are the same as in Figure 6. In other words, the vanes will always so move as to follow the pilot valve to bear a definite angular relationship with respect thereto.

Figure 9:
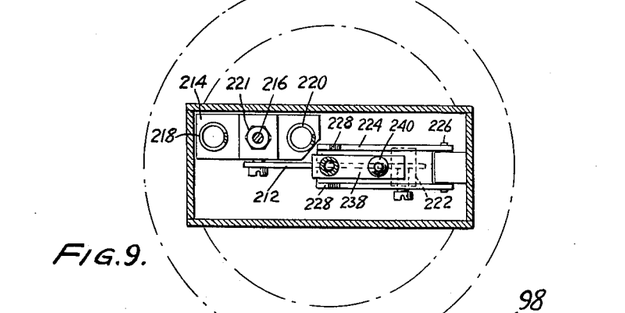
Figure 9 is a transverse section of the same, taken on the plane indicated at 9—9 in Figure 8.

The details of the temperature control heretofore indicated at 198 are illustrated in Figures 8 and 9. The control comprises a member 202 seated in gas-tight fashion, for example by welding, in the wall of the exhaust passage 24 or alternatively in the gas chest 26. Extending downwardly into the passage or chest from the member 202 is a tube 204 made of heat-resistant alloy steel, and having its free end closed as at 206 by a plug of suitable material. Secured to this plug is one end of a quartz rod 208, the other end of which is secured to a head 209 pivoted at 210 to a lever 212 which is fulcrumed at one end to a block 214 slidable on a rod 216 and normally urged downwardly to the position illustrated by means of springs 218 and 220, the limiting position being defined by adjustment of a screw 221. The sole purpose of having this yieldable fulcrum rather than a fixed one is to avoid damage of the unit at ordinary temperatures, the fulcrum yielding upon the extreme contraction of the tube 204. The lever 212 carries at 222 a knife edge which bears upon a lever 224 pivoted at 226 to the housing. The free end of the lever is provided with upwardly extending points indicated at 228, engaging a washer 230 upon which bears a compression spring 232, the upper end of which engages a diaphragm 234 supported by a flexible bellows 236. Connected to the diaphragm 234, and extending through the spring 232 and washer 230 is a member 238 of the shape indicated provided with drilled holes forming a passage communicating at one end with the space 235 above the diaphragm 234 and at its other end with the valve opening 240 which is adapted to seat and close by engagement with a fixed rigid plate 242.

The connection illustrated at 96 in Figure 3 communicates through the opening 243 with the chamber 235 outside the diaphragm 234.

Under normal conditions of the operating temperature the elongation of the metal tube 204 will not be sufficient to relieve the pressure exerted by the spring 232 as to permit the pressure existing above the diaphragm 234 to remove the member 238 from its seated position against the plate 242. Thus the communication 240 will be closed and air will be prevented from escaping from the chamber above the diaphragm 234. This condition will exist for the highest pressure existing in the line 96 to maintain the bypass valve 41 open to any normal extent. If, however, the temperature rises to an abnormal degree, the quartz rod 208 will follow the metal tube 204 still further, releasing through the lever connections the washer 230 to such an extent as to reduce the tension of spring 232, thus permitting the pressure above the diaphragm 234 to force the same downwardly. Venting occurs more rapidly than flow through resistance 62 with a resulting attainment of an equilibrium condition in which the pressure in chamber 235, and hence available for control of motor 42, is a function of the temperature for some particular temperature range. This pressure, in the vicinity of the maximum permissible temperature, will be so low as to cause at first partial and then complete closure of valve 41 with temperature increase, taking control of this valve away from relay 66 despite low delivery pressure which might otherwise keep 41 open. With the arrangement illustrated a substantially linear relationship between the temperature in 24 and the pressure in chamber 235 may be secured.

Figure 10:
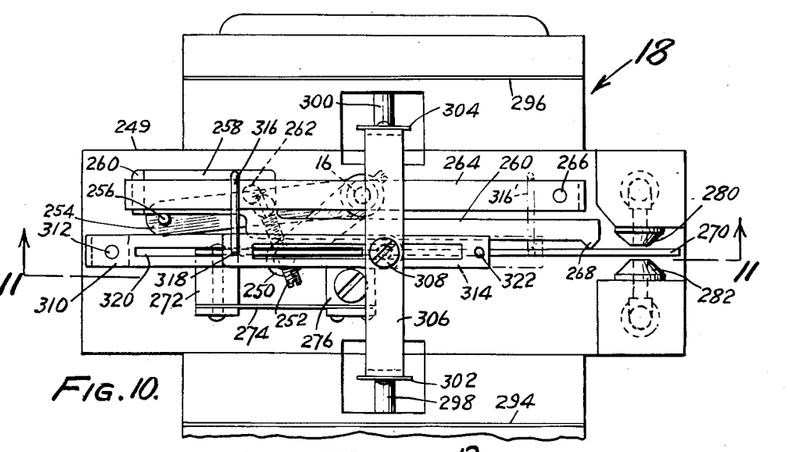
Figure 10 is a plan view of the pneumatic relay responsive to surge.
Figure 11:
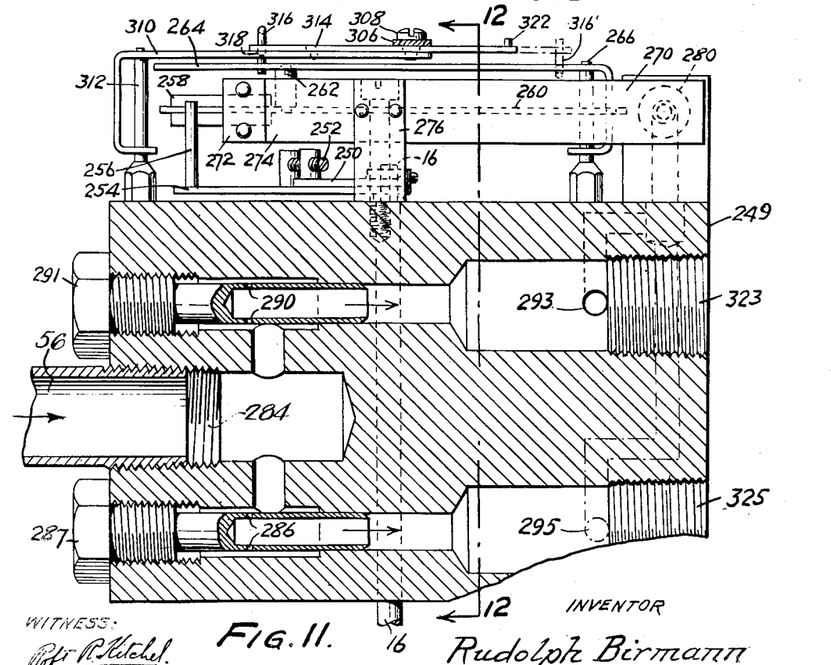
Figure 11 is a section through the same, taken on the plane indicated at 11—11 of Figure 10.
Figure 12:
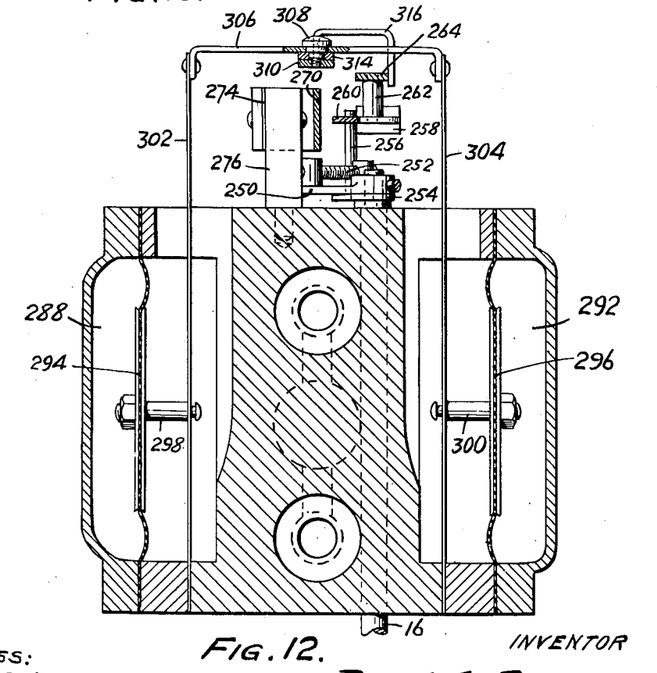
Figure 12 is a further section through the same, taken on the plane indicated at 12—12 in Figure 11.
Figure 13:
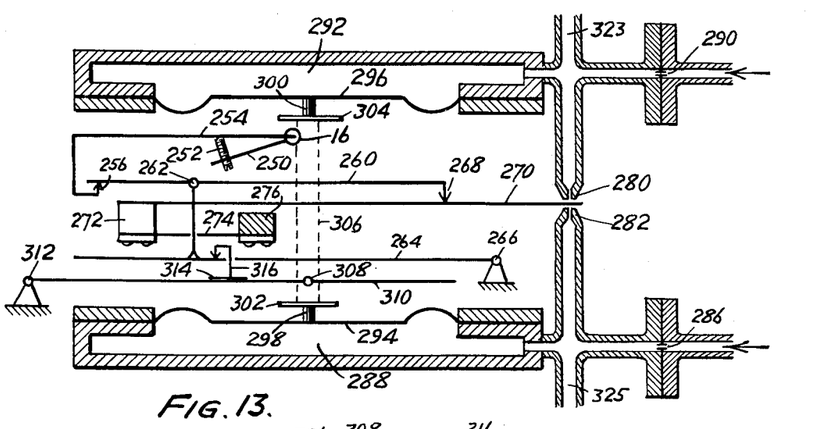
Figure 13 is a diagram provided for the purpose of rendering clear the operation of the device shown in Figures 10 to 12.

The anti-surge control 18 is detailed in Figures 10, 11, and 12 and further illustrated by way of a diagram in Figure 13 by which the operation will be clarified, various mechanical elements being conventionalized therein for purposes of illustration.

The shaft 16 which carries the flag 14 at its lower end, as this shaft is illustrated in Figures 11 and 12, is provided with bearings in a block 249 and carries at its upper end an arm 250 supporting an adjustable screw 252 arranged to abut an upstanding post supported by an arm 254 which is pivoted for free turning movement on the shaft 16. By adjustment of the screw 252 the angular relationship of the arm 254 to the flag carried by the shaft 16 may be adjusted so that the control will operate through a predetermined range of movement of the flag, for example the range immediately preceding surge for the particular installation involved.

The arm 254 carries a pin 256 which is arranged to engage the counterweighted end 258 of a lever 260 pivoted at 262 to a pin carried by a lever 264 which has a fixed pivot at 266. The end 268 of the lever 260 is arranged to engage a vane 270 carried by a block 272 mounted at the free end of a flat spring 274 secured to the block 249 at 276. The initial arrangement of spring 274 is such as to cause the vane 270 normally to engage an orifice 280 to close the same, the vane having a limited motion between two opposed orifices 280 and 282 so as to restrict air flow from one or the other to a degree depending upon its position between them.

Air is arranged to enter the block 249 at 284 from the connection 56 (Figure 3) joined to the controlled-pressure side of the regulator 60. The air thus entering 284 passes through branch connections and respective orifices 286 and 290 provided in plugs 287 and 291 to respective passages 295 and 293 communicating with the orifices 282 and 280 and also with chamber 288 and 292 respectively closed by flexible diaphrams 294 and 296. The diaphragms 294 and 296 have loose connections indicated at 298 and 300 with leaf springs 302 and 304 fixed at their lower ends as viewed in Figure 12 and connected at their upper ends by a bridge 306. Pivoted in this bridge 306 is a screw 308 which is threaded into a lever 310 having a fixed pivot 312, the screw clamping against this lever a slide 314 slotted for adjustment purposes and prevented from rotary movement relative to the lever 310 by engagement of a downwardly extending pin 318 within a longitudinal slot 320 in the lever 310. The pin 318 may conveniently form the end of a bent wire 316 carried by 314 and arranged to extend over, and engage, the lever 264 as indicated in the figures. The wire 316 provides an adjustable point of engagement between the levers 310 and 264 which engagement, for a wide range of adjustment, must be on both sides of the bridge 306. The member 314 is, therefore, adapted to be inverted so that the wire 316 may occupy a position 316' where it will also engage the lever 264 but will be on the opposite side of the bridge 306. In such inverted position, a pin 322 engages within the slot 320 so that the member 314 and lever 310 form, in effect, a rigid unit.

As will be evident from comparison of Figure 13 with Figures 10, 11, and 12, the parts therein are diagrammed from the standpoint of their mechanical functions. The operation of the control will be made clear from consideration of Figure 13.

So long as the flag 14 occupies a normal position during proper operation of the compressor, the lever 250 will occupy a normal counter-clockwise position as viewed in Figure 13 and will be followed in this direction by the lever 254 to the extent that the lever 254 is so urged by the vane 270 when in its extreme position closing the orifice 280, which position, as pointed out above, is that normally assumed under the action of the leaf spring 274. Under these conditions the pressure in the chamber 292 is high and the pressure delivered through the connection 323 corresponds thereto. The bridge 306 is then urged in the downward direction as diagrammed in Figure 13, the pivot 308 being in a position to correspond. Due to the fact that the orifice 282 is opened with a minimum of restraint by the vane 270 air may freely escape therethrough, and since the air is delivered through the restrictions offered by 286, the pressure in chamber 288 and connection 325 will be low.

If, now, the flag is moved toward the position occupied when surge occurs, the shaft 16 will be rotated clockwise as viewed in Figure 13, arm 254 being thereby rotated in the same direction. Lever 260 will also be rotated clockwise about pivot 262 so that the end 268 of lever 260 will move the vane 270 away from the orifice 280 toward 282. As a result of this, bleeding of air occurs through 280 while that through 282 may be somewhat restricted if the clearances are small. Since the air passing from 280 reaches it through the restriction afforded at 290, the pressure in the chamber 292 and connection 323 will drop. At the same time, the free bleeding of air through 282 being somewhat restricted, the pressure in chamber 288 and connection 325 will rise. The result is that the bridge 306 moves upwardly carrying with it the pivot 308. The lever 310, therefore, swings counterclockwise carrying the wire loop 316 with it and releasing the pivot 262 in such a fashion as to permit the vane 270 to move again toward the orifice 280. By reason of the foregoing action, a stable movement is secured so that for the given new position of the shaft 16, a new pressure difference between 323 and 325 exists. Thus this pressure difference is made a function of the position of the shaft 16, being substantially linear within the useful range of movement of the shaft, by reason of the follow-up action afforded by the bridge connection.

This pressure difference, which is reflected as a pressure relative to atmosphere in either of connections 323 or 325, may be applied to control of the spill valve motor 46. If that motor is single-acting as described previously in connection with Figure 4, the chamber 200 may be connected either to 323 or 325 depending upon whether it is desired to use air to close or open the spill valve.

Figure 14:
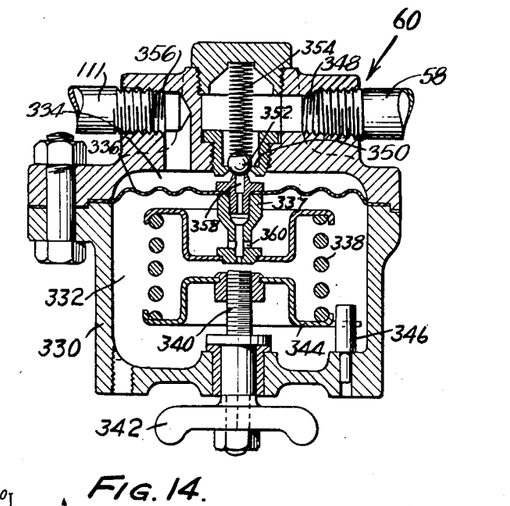
Figure 14 is an axial section through a pressure control element designed to supply air for the control operations at a pressure of predetermined amount above atmospheric pressure.

The pressure regulator 60 is illustrated in Figure 14. It comprises a casing 330 providing a chamber 332 open to the atmosphere and a chamber 334 separated from the chamber 332 by a flexible diaphragm 336. This diaphragm is acted upon through the medium of a stem assembly 337 by a strong spring 338, the compression of which is adjustable by the turning of a screw 340, journalled in the housing, by means of a knob 342.

The screw carries a nut member 344 on which rests the spring 338, the member 344 being axially movable, but restrained against rotation by embracing a fixed pin 346. The inlet for the air supply is indicated at 348. The flow of air is under the control of a ball 352 adapted to rest upon a seat 350 under the action of a weak spring 354. The outlet from which air emerges under controlled pressure is indicated at 356. Venting of chamber 334 to the atmosphere is effected through passage 358 in assembly 337, this passage being also controlled by ball 352.

When the parts are in equilibrium, i. e., when the ball 352 is seated on both 350 and 358, it will be evident that the delivery pressure in chamber 334 will exceed that in 332 (atmospheric) by a definite amount depending upon the compression in spring 338. If the pressure in 334 rises above this, air is vented through 358. On the other hand, if the pressure in 334 drops, air enters through 350. In view of the fact that the slightest movement of the diaphragm will open one or the other of the openings, it will be evident that the control is highly critical and accurate. In the present instance, it has been found desirable to operate the various elements at a controlled pressure of about 2 inches of mercury above atmospheric pressure.

If control 60 is supplied with air at less than the predetermined gauge pressure, it will supply air at the compressor discharge pressure. At this time the vent 146 of relay 142 will be closed so that the waste gate will also close, the motor 38 being supplied with a control pressure as high as available, the arrangement being such that this gate is fully closed by a pressure substantially less than the gauge pressure for which 60 is set. The compressor, therefore, strives to maintain as high a gauge pressure as operating conditions (e. g., altitude in the case of aircraft) permit, subject to speed limitations.

Figure 15:
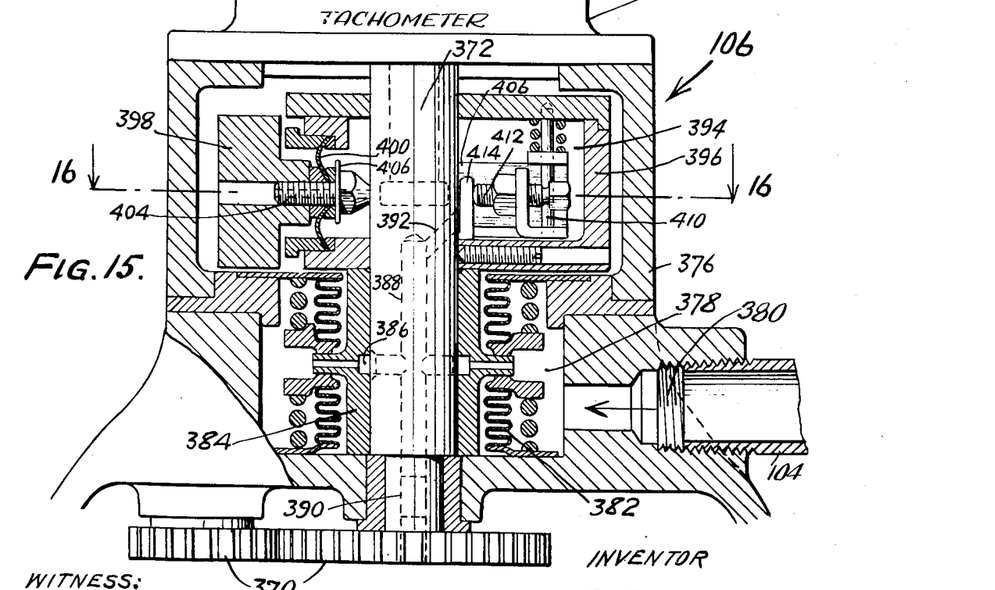
Figure 15 is an axial sectional view showing a control responsive to speed of operation of the compressor, the section being taken on the broken surface the trace of which is indicated at 15—15 in Figure 16.
Figure 16:
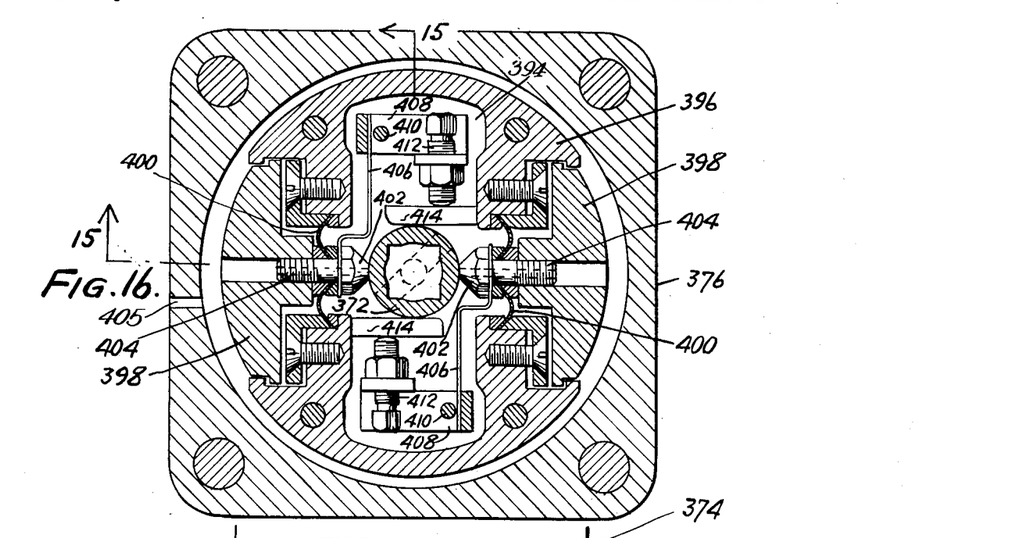
Figure 16 is a transverse section through the same, taken on the plane indicated at 16—16 in Figure 15.

The speed control 106 is detailed in Figures 15 and 16. It is customary to provide a tachometer geared to a turbo supercharger shaft for observation of its speed, and in the present instance it has been found convenient to associate the speed control with the tachometer connections. The speed-reducing gearing to the tachometer embodies pinions 370 which may be regarded as driven by the gearing 108 conventionalized in Figure 3. A shaft 372 is driven by this gearing and serves to drive a tachometer which is fragmentarily indicated at 374. Between the gearing 370 and the tachometer 374 there is located the speed control including the housing 376.

A chamber 378 communicates through an inlet 380 with the line indicated at 104 in Figure 3, control being effected by the venting of the connection 104 to the atmosphere when the speed of the shaft 372 exceeds some predetermined amount. The chamber 378 is closed by a flexible diaphragm and spring arrangement indicated at 382 except for its communication through an annular passageway 386 and radial connections in a sleeve 384 within which the shaft 372 is plugged at 390 and has radial communications with the annular groove 386 to receive air from chamber 378 and pass it through side connection 392 into the space 394 within a housing 396 secured to and rotating with the shaft 372. Associated with the housing 396 are weights 398 connected thereto in flexible but airtight relationship by means of flexible discs 400, the arrangement being such that except for vents hereafter mentioned, the chamber 394 is closed against the escape of air.

The weights 398 carry members 402 which are bored as indicated at 404 to provide vents from the chamber 394. The inner ends of the bores 404 are ground to fit tightly against ground surfaces in the shaft 372 to effect normally a closure of the vent passages under the action of leaf springs 406 secured to levers 408 pivoted at 410 to the housing 396, the tensions of the springs 406 being adjustable through the medium of screws 412 bearing against ears 414 carried by the housing, thereby to effect venting at predetermined adjustable speeds.

At normal rotary speeds the tensions of the springs 406 are sufficient to keep the members 402 in tight contact with the shaft 372 preventing escape of air. When, however, the speed reaches a predetermined value, centrifugal force acting upon the weights 398 will cause them to move outwardly against the tensions of the springs, thereby opening the vent passages 404 and permitting escape of air so as to vent the line 104 to the atmosphere through opening 405, the chamber 376 being open to the atmosphere. As will be evident from the foregoing description, this results in the opening of the waste gate 36, the effect of which is to reduce the turbine speed.

The operation of the system of Figure 3 has been described with reference to pressure, temperature, and speed conditions which are the proximate causes of the control operations. While the foregoing discussions apply generally for various uses of the controls alone or in combination, the system is particularly designed for use in aircraft, and there may be described with reference to Figure 18 the particular relationships between flying conditions, the proximate causes referred to above of the control operations, and the effects of the controls on the operations.

Figure 18:
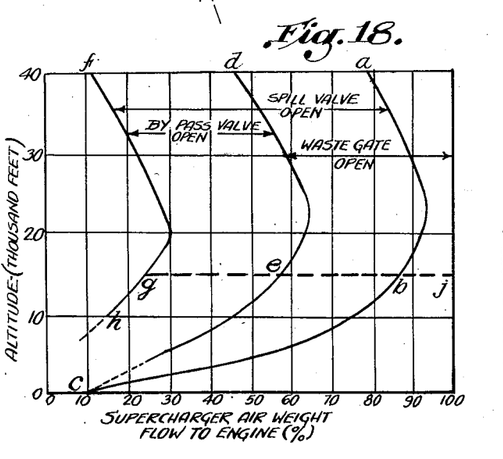
Figure 18 is a graph illustrative of the application of the present invention to the supercharging of aircraft engines.

In Figure 18 there are shown various events plotted in a domain of the two variables of altitude and supercharger air weight flow to an aircraft engine. The latter is a function of the power delivered by the engine, i. e., is a factor under control of the pilot, 100 per cent representing the operation of the engine to secure maximum output at any altitude and the lower percentage representing throttling down of the engine to various extents depending upon the speed or climb required.

The curve $abc$ represents a typical limit of stable operation of a compressor; in other words, it shows the minimum air delivery at various altitudes above which surge will not occur. In the region to the right of this curve, therefore, the spill valve will be closed and, in fact, the waste gate will be open to an extent determined by the control system since the gases discharged from the engine are more than ample to keep the turbine running to supply the load imposed by the compressor in delivering air at proper pressure to the engine. The region between the curve $abc$ and the curve $dec$ represents the conditions in which, by reason of opening of the spill valve, surge may be avoided while, however, the engine though throttled down, still delivers more than sufficient gases for the purpose of driving the turbine to maintain the required supercharging pressure. (The two curves, it will be noted, are shown meeting at a common point at sea level; while this is generally the case, it is not necessarily so and it will, therefore, be understood that the two curves may meet the axis at different points or may intersect at some altitude above sea level.)

In the region between the curves $abc$ and $dec$, the waste gate will be open to a greater or less extent to provide the proper amount of gas to the turbine to take the load. The line $dec$, however, represents closure of the waste gate.

The region to the left of the line $dec$ would represent a region in which the turbine would be unable to maintain the necessary air pressure. To provide for operation in such region, the bypass valve will open permitting air to flow from the compressor to the gas chest of the turbine to assist in driving the turbine, the pressure of the air being substantially above that of the exhaust gases from the engine. This bypass of air permits operation to continue down to the conditions represented by the line $fgh$, under which conditions the supercharger can no longer maintain substantially the normal supercharging air pressure.

A typical operation may be considered by referring to the line $jbeg$ representing what occurs as the pilot, flying at a given altitude, closes the engine throttle. As the throttle is closed to cut down the air weight to the amount represented at $b$, a tendency for surge to occur would arise controlling the opening of the spill valve. Throttling down still further the pressure delivered by the supercharger would tend to fall, requiring for its maintenance the gradual closing of the waste gate to the point where the waste gate is fully closed, the spill valve still being open to prevent surge. As the throttle is still further closed, despite the less weight demand of air by the engine, the corresponding exhaust gases, taken alone are not able to maintain the power delivered by the turbine sufficient to supply the demand. As the pressure drops off, since the waste gate is closed, the bypass relay will come into operation to open the bypass valve and supply the necessary additional power fluid for the turbine. At point $g$ there is reached the limit to which the engine may be throttled while still maintaining substantially the desired supercharger pressure, the supercharger pressure falling off rapidly below this line.

Along the entire line $bg$ the total flow through the compressor is maintained constant; i. e., from $b$ to $e$ this constant total flow is that to the engine plus that through the spill valve, while from $e$ to $g$ the constant total is that to the engine plus that through the bypass plus that through the spill valve. If the spill valve is, for stability, faster acting than the bypass valve, the spill valve will ordinarily start to close at $e$ and will be fully closed at $g$.

It may be remarked that attainable high compressor and turbine efficiencies will maintain the compressed air pressure in excess of the exhaust pressure from the engine even with a single stage compressor so that the bypass may function as described to augment the turbine driving power. With multiple stage compression even more power becomes available to the turbine through the use of the bypass.

For the starting of a unit of the type described, it is only necessary to close the waste gate by manual control until the normal operating speed is attained.

As described so far, the invention contemplates avoidance of burning any unburned fuel in the engine exhaust gases by bypassed air. Generally, if the turbine is to supply air for supercharging purposes only, under those conditions during which unburned fuel is exhausted from the engine the turbine is supplied with ample exhaust gases for its operation and bypass of air thereto is not only unnecessary but to be avoided to prevent abnormally high temperatures in the turbine. This, however, is not the case if the turbine is to supply additional mechanical power or if the gases from the engine passed wholly through the turbine or only in part through the turbine are to form a propulsion jet. In either case it may be desirable to increase the supercharger size to supply a large excess of air bypassed not only to keep up the supercharger pressure under conditions of low engine demand but to provide the necessary air to burn the fuel exhausted from the engine and limit the temperature as may be required. For the use of an overrunning clutch arrangement to enable the turbine to drive a propeller, for example under take-off conditions, by using unburned fuel from the engine, reference may be made to my Patent Number 2,443,717 dated June 22, 1948. It will be evident that by adjustment of the controls disclosed herein they may be so related as to permit burning of fuel from the engine in bypassed air in a system in which the turbine may thus drive a propeller or otherwise aid an internal combustion engine in other than aircraft or marine uses. The controls may be subjected to manual control for this purpose to suspend temporarily their inhibitive actions described above. For the utilization of combustion gases for jet propulsion purposes reference may be made to my Patent Number 2,477,683 dated August 2, 1949, to the matters of which it will also be clear that the control devices hereof may be applied. In such cases the bypassed air may flow not only through the turbine but also, even to a major extent, through a "waste gate," away from the turbine, but to a passage giving rise to a propulsion jet having a high kinetic energy. In either case the unburned fuel from the engine may be augmented by additional fuel introduced into the mixture of combustion gases and bypassed air or alone into the latter.

The burning of fuel exhausted from the engine in bypassed air may also be advantageous at extremely high altitudes where the power required to maintain sufficient compressor discharge pressure rises quite rapidly due to poorer adiabatic efficiencies and higher compression ratios. For conventional automatic carburetor settings the fuel to air ratio rises considerably at high air flow rates to the engine and the system described by allowing burning of the excess fuel in the bypassed air will aid in maintaining high power at high altitudes.

As indicated heretofore, the invention is susceptible of many changes and of application not only to supercharger systems but quite generally to the control of centrifugal compressors when motor driven, in which case the surge control alone may be of interest. The invention is also applicable to combustion turbine power plants in which a turbine used alone or associated with other turbines is arranged to deliver mechanical power and, at the same time, must supply air for the combustion of fuel either in a burner or through an associated auxiliary engine. The invention, accordingly, is to be understood as not limited except by the accompanying claims.

What is claimed is:

1. In combination, a centrifugal compressor comprising an impeller, a turbine for driving said impeller, means for burning fuel in air delivered by said compressor thereby providing combustion gases to drive said turbine, means responsive to approach of surge conditions in the impeller for controlling flow therethrough to avoid surge, means responsive to the pressure of air delivered by the compressor, and means controlled by the last-mentioned means for bypassing air from the compressor directly to the turbine upon drop of delivery pressure.

2. In combination, a centrifugal compressor comprising an impeller, a turbine for driving said impeller, means for burning fuel in air delivered by said compressor thereby providing combustion gases to drive said turbine, means responsive to approach of surge conditions in the impeller for bypassing air from the fuel burning means to increase the air flow through the compressor, thereby to avoid surge, means responsive to the pressure of air delivered by the compressor, and means controlled by the last-mentioned means for bypassing air from the compressor directly to the turbine upon drop of delivery pressure.

3. In combination, a centrifugal compressor comprising an impeller, a turbine for driving said impeller, means for burning fuel in air delivered by the compressor thereby providing combustion gases to drive said turbine, means responsive to the pressure of air delivered by the compressor for diverting combustion gases from the turbine, and means responsive to the pressure of air delivered by the compressor for bypassing air from the compressor directly to the turbine upon drop of delivery pressure.

4. In combination, a centrifugal compressor comprising an impeller, a turbine for driving said impeller, means for burning fuel in air delivered by the compressor thereby providing combustion gases to drive said turbine, means responsive to the pressure of air delivered by the compressor for diverting combustion gases from the turbine, and means responsive to the pressure of air delivered by the compressor for bypassing air from the compressor directly to the turbine upon drop of delivery pressure, and upon closure of the gas diverting means.

5. In combination, a centrifugal compressor comprising an impeller, a turbine for driving said impeller, means for burning fuel in air delivered by the compressor thereby providing combustion gases to drive said turbine, means responsive to the pressure of air delivered by the compressor for diverting combustion gases from the turbine, means responsive to approach of surge conditions in the compressor for controlling flow therethrough to avoid surge, and means responsive to the pressure of air delivered by the compressor for bypassing air from the compressor directly to the turbine upon drop of delivery pressure.

6. In combination, a centrifugal compressor comprising an impeller, a turbine for driving said impeller, means for burning fuel in air delivered by the compressor thereby providing combustion gases to drive said turbine, means responsive to the pressure of air delivered by the compressor for diverting combustion gases from the turbine, means responsive to approach of surge conditions in the compressor for controlling flow therethrough to avoid surge, and means responsive to the pressure of air delivered by the compressor for bypassing air from the compressor directly to the turbine upon drop of delivery pressure, and upon closure of the gas diverting means.

7. In combination, a centrifugal compressor comprising an impeller, a turbine for driving said impeller, means for burning fuel in air delivered by the compressor thereby providing combustion gases to drive said turbine, means responsive to the pressure of air delivered by the compressor for diverting combustion gases from the turbine, means responsive to approach of surge conditions in the compressor for bypassing air from the fuel burning means to increase the air flow through the compressor, thereby to avoid surge, and means responsive to the pressure of air delivered by the compressor for bypassing air from the compressor directly to the turbine upon drop of delivery pressure.

8. In combination, a centrifugal compressor comprising an impeller, a turbine for driving said impeller, means for burning fuel in air delivered by the compressor thereby providing combustion gases to drive said turbine, means responsive to the pressure of air delivered by the compressor for diverting combustion gases from the turbine, means responsive to approach of surge conditions in the compressor for bypassing air from the fuel burning means to increase the air flow through the compressor, thereby to avoid surge, and means responsive to the pressure of air delivered by the compressor for bypassing air from the compressor directly to the turbine upon drop of delivery pressure.

9. Apparatus for keeping within the pumping limit a supercharger having a rotatable member carrying a first set of blades stationary with respect to the rotatable member, a stationary member carrying a second set of blades stationary with respect to the stationary member and a delivery line, said apparatus comprising a special blade movably mounted on the stationary member adjacent the second set of blades so as to be responsive to direction of flow from the rotary blades, said special blade being positionable in a first range during normal operation of the supercharger and in a second range when the pumping limit of the supercharger is approached or reached, a spill valve in the delivery line of the supercharger, and means connecting the special blade and the spill valve for causing a movement of the special blade due to approach or arrival of the pumping limit to increase the opening of the spill valve.

10. Apparatus for keeping away from the pumping limit a supercharger having a rotatable member carrying a first set of blades stationary with respect to the rotatable member, a stationary member carrying a second set of blades stationary with respect to the stationary member and a delivery line, said apparatus comprising a special blade mounted on the stationary member adjacent the second set of blades for angular movement about its own axis with respect to the stationary member so as to be responsive to direction of flow from the rotary blades, said special blades being positionable in a first range during normal operation of the supercharger and in a second range when the pumping limit of the supercharger is approached or reached, a spill valve in the delivery line of the supercharger, and means connecting the special blade and the spill valve for causing movement of the special blade due to approach or arrival of the pumping limit to increase the opening of the spill valve.

11. Apparatus for keeping away from the pumping limit a supercharger having a rotatable member carrying a first set of blades stationary with respect to the rotatable member, a stationary member carrying a second set of blades stationary with respect to the stationary member and a delivery line, said apparatus comprising a special blade mounted on the stationary member adjacent the second set of blades for angular movement about its own axis with respect to the stationary member so as to be responsive to direction of flow from the rotary blades, said special blade being positionable in a first range during normal operation of the supercharger and in a second range involving a greater angle to the axis of rotation of the supercharger than that of the stationary blades when the pumping limit of the supercharger is approached or reached, a spill valve in the delivery line of the supercharger, and means connecting the special blade and the spill valve for causing angular movement of the special blade to a position of greater angle to the axis of rotation of the supercharger than that of the stationary blades due to approach or arrival of the pumping limit to increase the opening of the spill valve.

12. Apparatus for keeping away from the pumping limit a supercharger having a rotatable member carrying a first set of blades stationary with respect to the rotatable member, a stationary member carrying a second set of blades stationary with respect to the stationary member and a delivery line, said apparatus comprising a special blade mounted on the stationary member adjacent the second set of blades for angular movement about its own axis with respect to the stationary member so as to be responsive to direction of flow from the rotary blades, the special blade being positionable in one range during normal operation of the supercharger and in another range when the pumping limit of the supercharger is approached or reached, a spill device in the delivery line of the supercharger, a fluid-pressure system for acting through reduction of fluid pressure therein to increase the opening of the spill device, a valve in the fluid-pressure system for reducing the pressure therein, and means connecting the special blade and the valve for causing angular movement of the blade due to approach or arrival of the pumping limit to make the valve reduce the pressure in the fluid pressure system and thereby to increase the opening of the spill device.

RUDOLPH BIRMANN.

REFERENCES CITED

The following references are of record in the file of this patent:

UNITED STATES PATENTS

| Number | Name | Date |
|---|---|---|
| 908,227 | Elling | Dec. 29, 1908 |
| 1,136,877 | Homersham | Apr. 20, 1915 |
| 1,280,812 | Moss | Oct. 8, 1918 |
| 1,281,216 | Schellens | Oct. 8, 1918 |
| 1,325,255 | Loewenstein | Dec. 16, 1919 |
| 1,680,775 | Faber | Aug. 14, 1928 |
| 2,095,991 | Lysholm | Oct. 19, 1937 |
| 2,244,467 | Lysholm | June 3, 1941 |
| 2,257,982 | Seippel | Oct. 7, 1941 |
| 2,297,235 | Müller | Sept. 29, 1942 |
| 2,316,452 | Pfenninger | Apr. 13, 1943 |
| 2,379,455 | Prince | July 3, 1945 |
| 2,398,619 | Clark et al. | Apr. 16, 1946 |
| 2,402,885 | Gilfillan et al. | June 25, 1946 |
| 2,404,323 | Staley | July 16, 1946 |

FOREIGN PATENTS

| Number | Country | Date |
|---|---|---|
| 272,519 | Great Britain | Dec. 8, 1927 |
| 421,110 | Great Britain | Dec. 17, 1934 |
| 41,806 | Denmark | Feb. 27, 1930 |